US009204759B2

(12) United States Patent
Stewart et al.

(10) Patent No.: US 9,204,759 B2
(45) Date of Patent: Dec. 8, 2015

(54) DRESSING SHAKER

(75) Inventors: Joshua Stewart, Seattle, WA (US); Sascha Kaposi, Tacoma, WA (US)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 607 days.

(21) Appl. No.: 13/547,424

(22) Filed: Jul. 12, 2012

(65) Prior Publication Data

US 2013/0201783 A1    Aug. 8, 2013

Related U.S. Application Data

(60) Provisional application No. 61/594,770, filed on Feb. 3, 2012.

(51) Int. Cl.
*A47J 43/27* (2006.01)
*A47J 43/10* (2006.01)
*B01F 11/00* (2006.01)
*B01F 15/00* (2006.01)
*B01F 13/00* (2006.01)
*A47J 47/01* (2006.01)

(52) U.S. Cl.
CPC .............. *A47J 43/1081* (2013.01); *A47J 47/01* (2013.01); *B01F 11/0082* (2013.01); *B01F 13/0022* (2013.01); *B01F 15/00512* (2013.01)

(58) Field of Classification Search
CPC .................................................... A47J 43/1081
USPC .................... 366/130, 332, 255, 256
See application file for complete search history.

(56) References Cited

U.S. PATENT DOCUMENTS

| | | | | |
|---|---|---|---|---|
| 2,545,240 | A | * | 3/1951 | Patoe .............................. 241/69 |
| 7,441,941 | B2 | * | 10/2008 | Vernon .......................... 366/130 |
| 8,191,727 | B2 | * | 6/2012 | Davies et al. .................. 220/707 |
| D700,807 | S | * | 3/2014 | Kershaw et al. ............... D7/510 |
| 2006/0250887 | A1 | | 11/2006 | Vernon |
| 2010/0284243 | A1 | | 11/2010 | Umsonst-Kubler |

FOREIGN PATENT DOCUMENTS

| | | |
|---|---|---|
| DE | 102008030623 | 7/2009 |
| WO | 0049929 | 8/2000 |

* cited by examiner

*Primary Examiner* — David Sorkin
(74) *Attorney, Agent, or Firm* — Lowe Graham Jones, PLLC

(57) ABSTRACT

A dressing shaker includes a container body having a spout. An internal mixing element is carried on an axle for sliding motion up and down the length of the rod, within the container. By shaking or inverting the container, the mixing element travels back and forth along the rod, mixing the dressing.

8 Claims, 4 Drawing Sheets

DRESSING SHAKER

PRIORITY CLAIM

This application claims the benefit of prior U.S. provisional application Ser. No. 61/594,770 filed Feb. 3, 2012, the contents of which are hereby incorporated by reference.

FIELD OF THE INVENTION

This invention relates generally to containers for mixing and pouring salad dressings.

BACKGROUND OF THE INVENTION

Many salad dressings are composed of a mixture of ingredients such as oil and vinegar which tend to separate from one another when sitting at rest. Consequently, such dressings must be constantly stirred or shaken in order to mix them prior to pouring them onto a salad.

While it is possible to shake a cruet or other such container to mix a dressing, the results are uneven and the shaking or stirring process can create a mess. In addition, if the dressing is poured directly from the bottle without shaking, the result is an application of a dressing that is imbalanced and dominated by the lightest ingredient that has risen to the top. Despite this well-known and long-standing problem, current salad dressing containers remain the same and fail to address the issue.

SUMMARY OF THE INVENTION

The preferred version of the present invention includes a container having a lid and a main body for holding a volume of dressing. The lid may include a pivoting spout to allow dressing to be poured from the container.

The shaker further includes a mixing element that is moveable along a length of the shaker. Most preferably, the mixing element is carried on a central axis for sliding motion up and down the length of the shaker.

In a version of the invention, the mixing element includes spiraling fins arranged in a complementary fashion to provide greater mixing ability.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
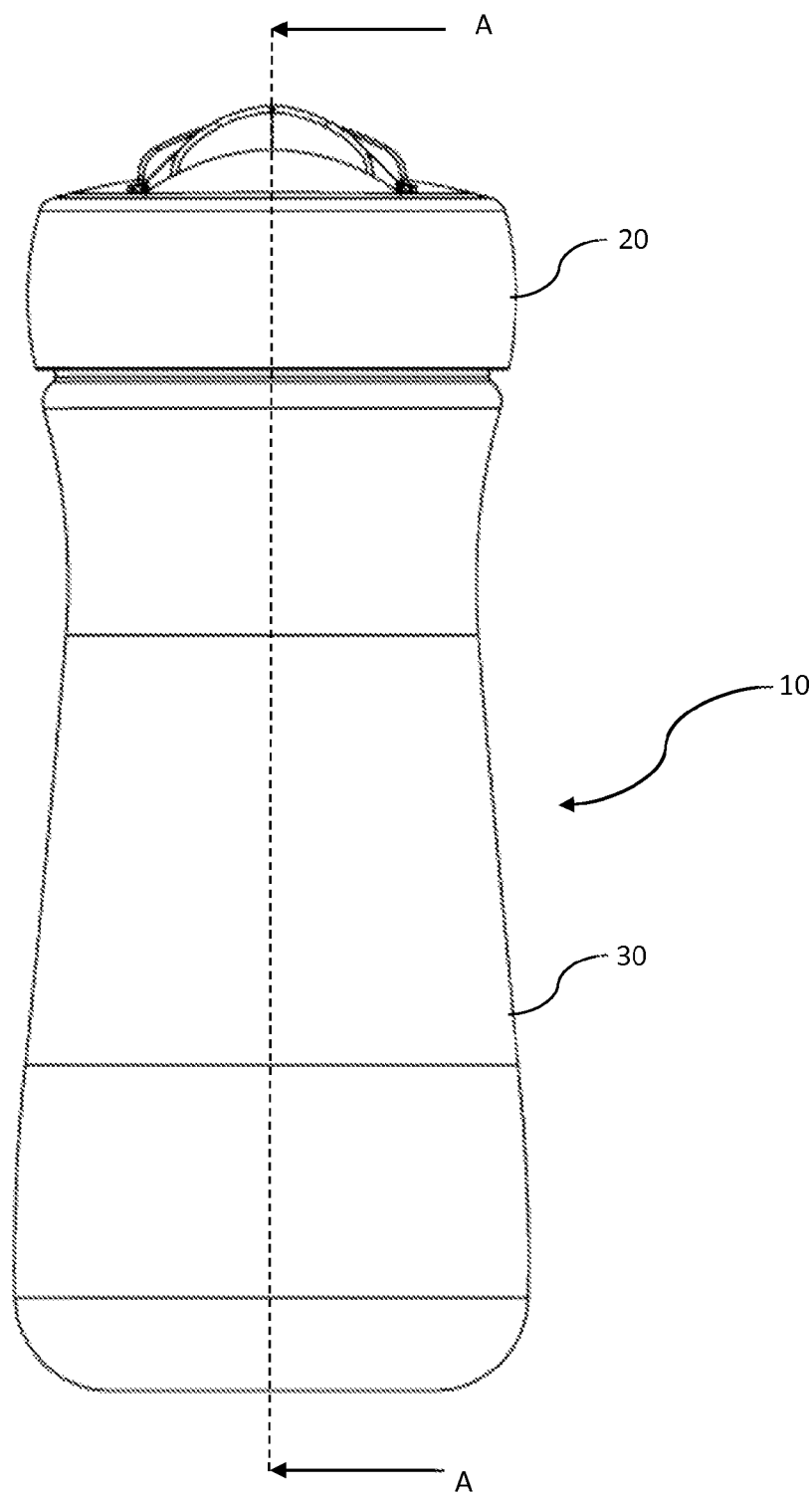
FIG. 1 is a front view of a preferred dressing shaker.
Figure 2:
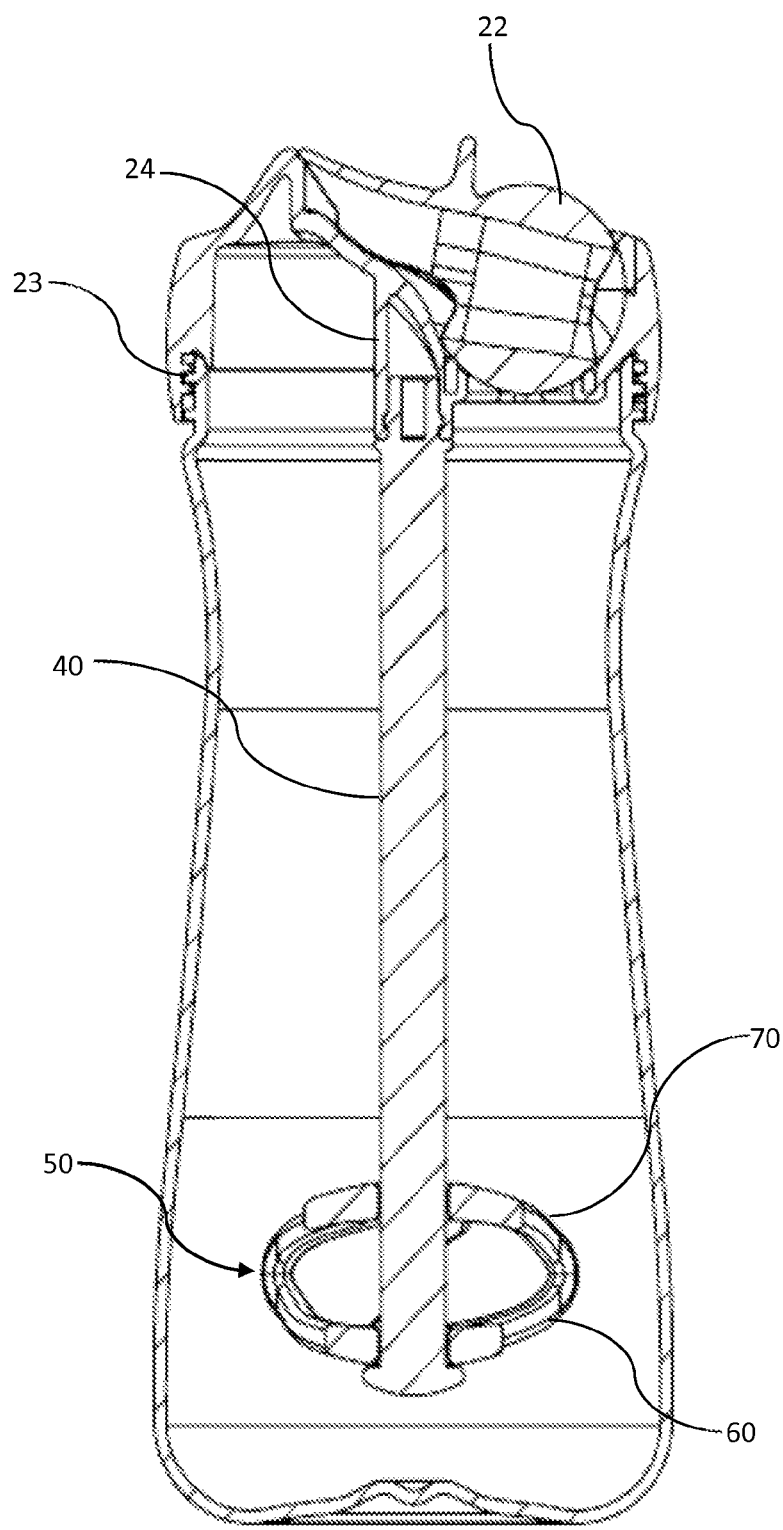
FIG. 2 is a sectional view of a preferred dressing shaker, taken along line A-A in FIG. 1.
Figure 3:
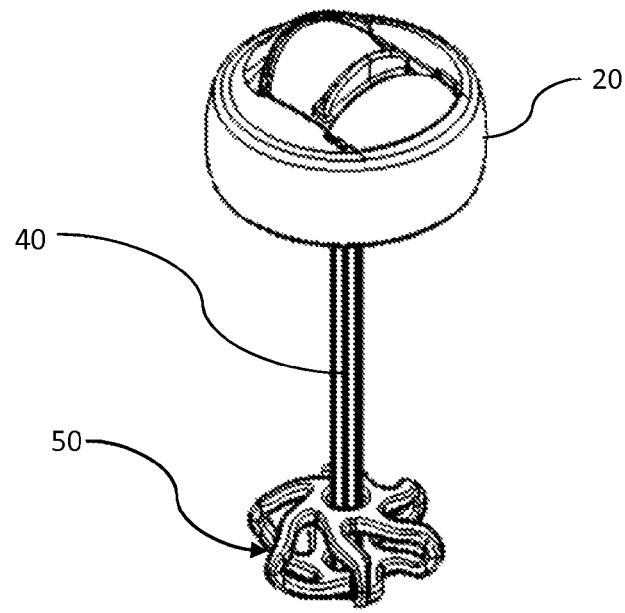
FIG. 3 is a perspective view of a preferred lid, axle, and mixing element.
Figure 4:
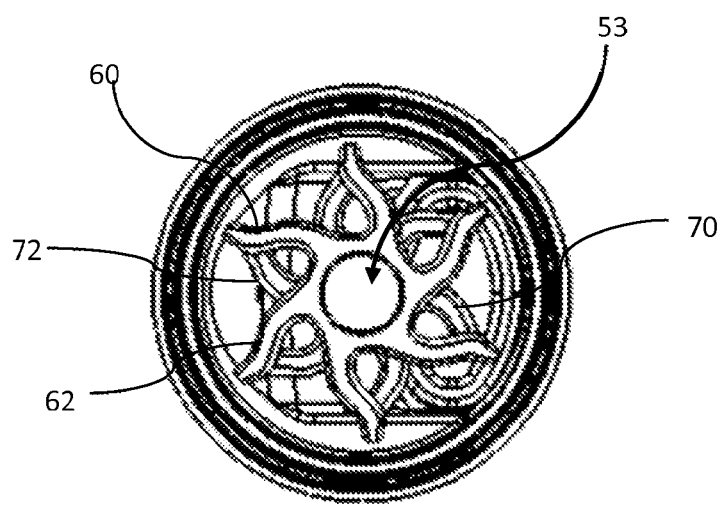
FIG. 4 is a bottom view of the lid, axle, and mixing element as illustrated in FIG. 3.
Figure 5:
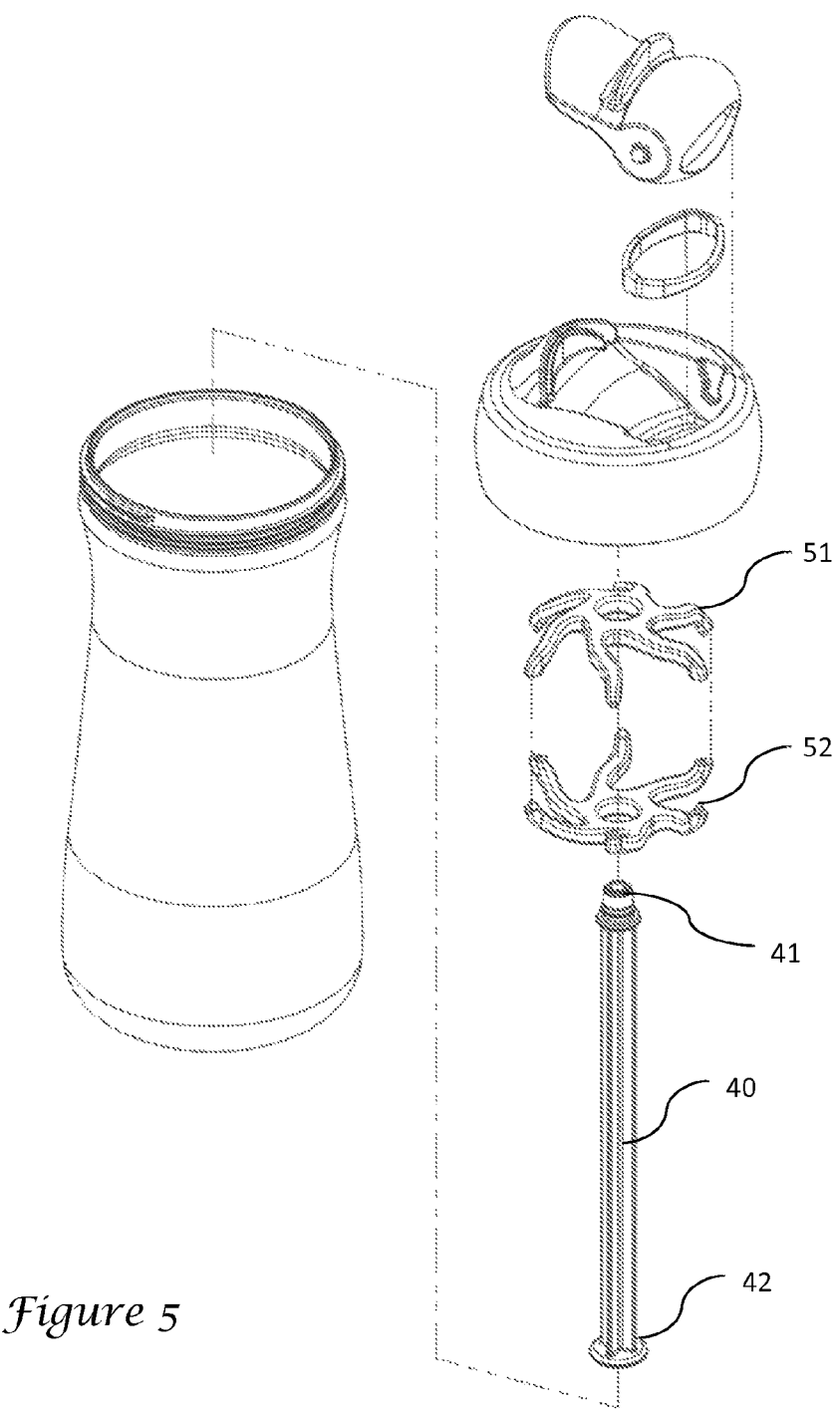
FIG. 5 is an exploded view of a preferred dressing shaker.

The preferred example of a dressing shaker 10 includes a container 30 and a lid 20. In one version, the container is circular in cross section, forming an upright cylinder with a height greater than the diameter of the circular cross section. In other versions the container may be differently shaped and need not have a height greater than its width.

The lid is removably secured to the container, for example by mating threads 23 provided on the container 30 and lid 20. The lid further includes a spout 22 to enable dressing or other liquids within the container to be poured through the spout. In the illustrated version, the spout 22 is pivotally secured to the lid in a ball and socket arrangement, such that pivoting the spout to a first position creates a continuous passageway through the spout and lid while pivoting the spout to a second stowed position causes a portion of the spout to block the passageway and seal the container.

The lid further includes a centrally positioned socket 24. The socket is sized and configured to receive an upper end 41 of a rod 40. The upper end of the rod may be received within the socket by a press fit, in which the rod is snugly received within the socket for a friction connection. Alternatively, it may include internal ridges, threads, or other surfaces to retain the rod within the socket. In other versions, the orientation may be reversed, such that a stem extends downward from the lid and a socket is formed at the upper end of the rod to receive the stem within it. Yet other configurations are also possible to securely attach the rod to an interior surface on the lid.

While it is preferable to secure the rod to the lid, in other versions of the invention the rod may extend upward toward the lid from a lower portion of the container, rather than extending downward from an internal portion of the lid. A similar attachment configuration may be used in such versions.

The axle or rod serves to guide a mixing element along the length of the container body from an upper end to a lower end of the container. In yet other versions, the guide may be formed along a sidewall of the container, such as in the form of channels or ridges configured in the sidewalls.

A mixing element 50 is carried on the rod 40, with the mixing element being mounted in a manner that allows it to travel along the length of the rod. In the illustrated example, the mixing element includes a central bore 53 that is sized to allow the rod to fit within it. Most preferably, the bore is sized such that it is larger than the widest portion of the rod, making it possible for the mixing element to travel along the length of the rod without contacting the rod. This size relationship allows the mixing element to travel with minimal frictional interference between the mixing element and the rod, and further allows the mixing element to rotate and tumble slightly as it travels along the length of the rod.

At a distal end of the rod, toward the bottom of the container, a flange 42 is formed to provide a stop to limit travel of the mixing element. The flange is sized to have a diameter greater than that of the bore, ensuring that the mixing element cannot fall off the end of the rod. While configured as a flange in the illustrated example, in other versions the rod may be formed with a stop in the shape of a ball, a T, or other shapes that are larger than the bore formed in the mixing element to thereby prevent the mixing element from traveling beyond the end of the rod. In yet other versions there is no stop at the end of the rod, and instead the rod extends to the bottom of the container in a manner such that the bottom of the container will prevent the mixing element from sliding off of the rod.

The mixing element includes a plurality of arms radiating outward from a central hub formed about the bore. In one version, the mixing element includes six arms equally spaced about the hub and extending outward toward the interior surfaces of the sidewalls forming the container. As the mixing element travels back and forth along the length of the rod, the arms pass through the dressing or other liquid with the container, mixing it as it passes through.

In the illustrated version, the mixing element is three dimensional, for example spherical, ellipsoid, ovoid, or otherwise having a dimensional height as well as a width and length. More particularly, the preferred version forms an ellipsoid. As shown, the mixing element is formed from an upper half 51 and a lower half 52, each of the two halves including a plurality of arms radiating outward and curving toward the other half. Thus, the arms of the upper portion arch downward as they extend radially outward, while the arms of the lower portion arch upward as they extend radially outward.

In each of the two portions as illustrated, the upper and lower portions include the same number of arms, which is six as shown. The distal end of each of the arms of the upper portion is secured to a corresponding distal end of an arm of the lower portion to attach the upper portion to the lower portion. The symmetrical shapes of the two halves thereby form the overall ellipsoid shape of the mixing element.

In one example, the upper portion and lower portion are each formed from substantially identical components. Thus, the upper portion 51 is formed as a central hub having a bore and six arms (e.g., 70, 72) radiating outwardly and downwardly. The arms also spiral in a counterclockwise direction, as viewed from the top, rather than radiating straight outward along a radius or diameter passing through the center of the hub. The lower portion is substantially identical to the upper portion, having arms (e.g., 60, 62) in the same configuration, but inverted about the horizontal axis. The tips of the ends of each arm may differ in that one may have a female end and the other a male end in order to connect the two portions, but otherwise the size and shape of the hub and arms is the same.

In use, a mixture such as a salad dressing is placed inside the container. The lid, having the rod and mixing element attached, is placed atop the container and fastened to seal it. By shaking the container in a direction generally along direction defined by the rod, the mixing element will be urged upward and downward along the rod, thereby also passing back and forth through the mixture. The multiple arms and spiral positioning cause the mixture to be mixed thoroughly.

As viewed from the top or the bottom, this inverted arrangement of spiraling arms effectively increases the number of arms that pass through the liquid within the container, providing an improved mixing action as the mixing element extends upward and downward along the length of the rod.

The agitator or mixing element 50 is preferably formed from a material that is sufficiently dense that it will sink in traditional salad dressing mixtures such as oil and vinegar. In some versions the agitator may be formed from plastic materials of sufficient densities, while in other versions it may be formed from metal or ceramic.

The density and configuration of the agitator is such that it will cause mixing of the dressing within the container even without shaking. At rest, the agitator sinks to the bottom of the container along with the other components of the mixture that are heaviest. As the container is inverted, the agitator will quickly sink to the bottom (which is the top of the container, with the spout, when inverted). This sinking action quickly draws some of the more dense liquids to the spout, while the arms of the agitator blend the liquids at the same time. While a shaking action is preferred to ensure a more uniform mixture, a single inversion with the agitator as described above will provide a degree of mixing that is superior to a container alone, without an agitator.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A dressing shaker, comprising:
   a container body having sidewalls defining an interior space, the container body further having a base at a lower end of the container and a spout at an upper end of the container, the spout providing a path for a flow of dressing from the interior space to a location outside the container body;
   a guide supported within the container body between the upper end and the lower end; and
   a mixing element slideably moveable along the guide, the mixing element having an upper portion and a lower portion joined together, the upper portion having an upper hub surrounding an upper central bore, the lower portion having a lower hub and a lower central bore, the guide being received within the upper central bore and the lower central bore, the upper portion further having a first plurality of arms radiating outwardly from the upper hub and spiraling about the guide in a first direction, the lower portion having a second plurality of arms radiating outwardly from the lower hub and spiraling about the guide in a second direction opposite the first direction, each of the arms from the first plurality of arms joining with a separate one of the arms in the second plurality of arms;
   whereby shaking the container body causes the mixing element to move along a path defined by the guide and to mix the dressing within the container body.

2. The dressing shaker of claim 1, wherein the guide further comprises a rod positioned centrally within the container body.

3. The dressing shaker of claim 2, wherein the container body further comprises a lid removably attached to the upper end of the container body.

4. The dressing shaker of claim 3, wherein the guide is attached to the lid and extends downward toward the lower end of the container.

5. The dressing shaker of claim 4, wherein the mixing element forms an ellipsoid.

6. The dressing shaker of claim 4, wherein the guide further comprises a stop formed on the guide, the stop being configured to retain the mixing element on the guide when the mixing element is adjacent the lower end of the container.

7. A dressing shaker, comprising:
   a container body having sidewalls defining an interior space, the container body further having a base at a lower end of the container and a removable lid forming a spout at an upper end of the container, the spout providing a path for a flow of dressing from the interior space to a location outside the container body;
   a guide removably attached to an interior side of the lid and extending within the container body between the upper end and the lower end when the lid is attached to the container body sidewalls; and
   a mixing element slideably moveable along the guide, the mixing element having an upper hub and a lower hub, each of the upper hub and the lower hub receiving the guide for movement of the mixing element along the guide, the mixing element further having a plurality of arms spiraling outward from the upper hub in a first spiral direction, each of the plurality of arms reversing direction to spiral in the opposite direction and being attached to the lower hub;

whereby shaking the container body causes the mixing element to move along a path defined by the guide and to mix the dressing within the container body.

8. The dressing shaker of claim 7, wherein the mixing element comprises a central bore formed through the upper hub and the lower hub, and the guide is received within the central bore, the guide further having a stop formed on the guide to limit travel of the mixing element along the guide.

* * * * *